20

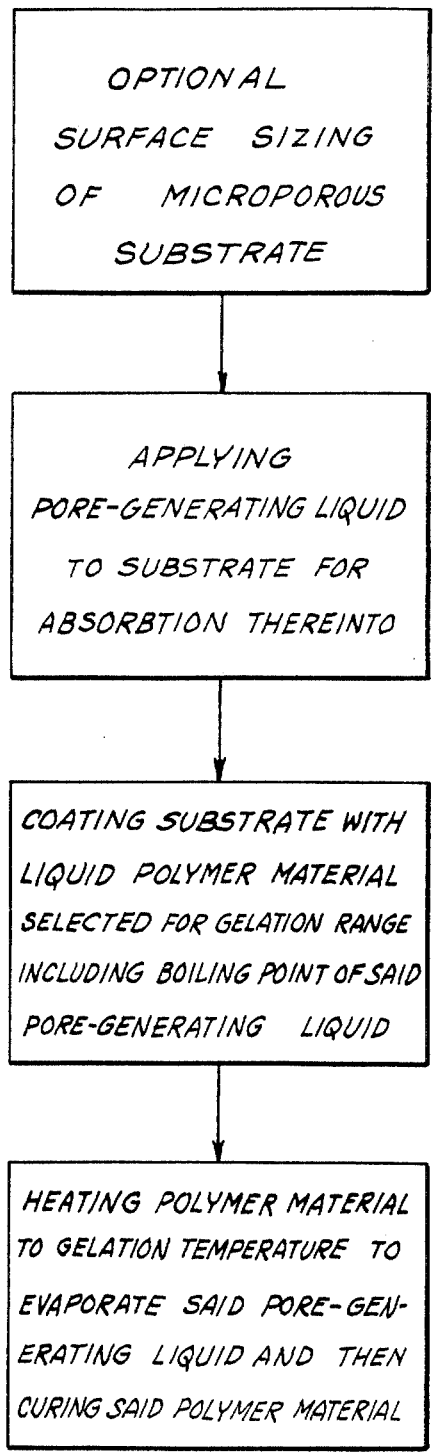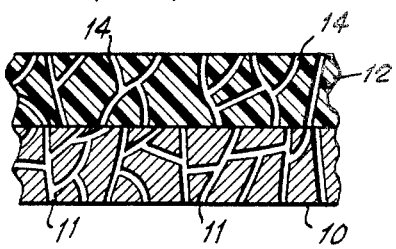

United States Patent Office 3,514,313
Patented May 26, 1970

3,514,313
MICROPOROUS COATED STRUCTURES AND METHOD OF PRODUCING SAME
George E. Martel, Westfield, and Michael C. Herrick, South Hadley, Mass., assignors to Texon, Inc., South Hadley, Mass., a corporation of Massachusetts
Filed May 16, 1967, Ser. No. 638,952
Int. Cl. B44d 1/092, 1/46
U.S. Cl. 117—60                                                 7 Claims

ABSTRACT OF THE DISCLOSURE

Microporous coated structures comprising a microporous substrate coated with a microporous coating, such as a microporous polyvinyl coating, wherein the overall permeability of the resulting microporous structure is at least a substantial fraction of the permeability of the microporous substrate, are obtained by applying a pore-generating material to the microporous substrate for absorption thereinto, followed by applying a coating of a polymeric material onto the microporous substrate and then heating the resulting structure or assembly to activate the pore-generating material and curing the applied polymeric material on said substrate. During heating of the polymeric material the pore-generating material is activated or otherwise converted into a gas, e.g. evaporated in the instance where the pore-generating material is a liquid, so as to produce a microporous coating of said polymeric material on said substrate.

BACKGROUND OF THE INVENTION

Field of the invention and description of the prior art

A wide variety of well known substrates are of a microporous nature. Such materials, being microporous, are able to "breathe" and therefore have many uses which are not possessed by vapor or liquid impervious film-like materials. Leather is the best known naturally occurring material having a microporous nature. A variety of synthetic materials including paper and paper-like sheets are also microporous. A high quality type of a microporous paper-like material is produced by binding cellulose fibers with elastomeric polymers or resins.

It is often desired to coat microporous substrate materials in situ with a plastic film suface so that the resulting composite structure will exhibit a high gloss and a resistance to moisture and soiling. It has long been desired to render such plastic coatings substantially as porous as the underlying substrate, while at the same time retaining the appearance of an unmodified plastic coating.

Various methods have been developed for producing microporous plastic coatings. One method is to mechanically pierce the plastic coating after it has been hardened. Such mechanical perforation of the film alters the appearance of the film, often rendering it visibly porous and with an oriented linear pattern. In addition, such mechanical perforation tends to weaken both the plastic coating and the substrate material. Also, the method requires expensive equipment and often interferes with the smoothness and gage control of the composite sheet material. Another method of rendering the plastic coating porous is to introduce chemical blowing agents into the plastic coating material so as to release gas during fusing of the plastic coating material to produce a spongy or foamy, solidified plastic coating.

What has been desired is a plastic coating for microporous substrate materials and a method for producing same wherein the porosity or permeability introduced into the plastic coating closely matches the porosity or permeability of the underlying substrate, and so that the surface manifestation of the pores is characterized by such penetration, size, distribution, concavity and continuity of the coating at the pore boundaries, that the luster, smoothness and physical properties of unmodified plastic coatings are retained insofar as visual and tactile inspection can testify. Such a product and method would be an even greater advance in the art if it could be practiced economically, in terms of both materials and operations, during the process of coating the substrate with the plastic coating.

It is a principal object of the present invention to provide a microporous plastic coating on a microporous substrate wherein the microporous plastic coating has substantially all the qualities in appearance and physical characteristics of an unmodified plastic coating.

Another object of the invention is to provide a plastic coating microporous sheet material wherein the porosity or permeability of the composite material is at least a substantial fraction, such as a major fraction, of the porosity or permeability of the substrate material and wherein the microporous plastic coating is glossy, smooth and apparently unmodified.

Another object of the present invention is to provide a lustrous, plastic coated, microporous substrate having good qualities of water vapor transmission.

SUMMARY OF THE INVENTION

A microporous coating of plastic or similar polymeric material is produced on a microporous substrate, such as a paper-like sheet of resin-impregnated cellulose fibers, by applying to said sheet for absorption thereinto a coating of a pore-generating material or liquid, such as an aqueous glycerin solution. Thereupon, a coating of plastic or polymeric material is applied to the coated substrate and the resulting assembly heated through the gelation temperature of the applied plastic or polymeric material, the boiling point or boiling point range of the applied pore-generating liquid being such that the pore-generating liquid is evaporated during the gelation stage of the applied plastic of the polymeric material and resulting evaporated liquid passes through said plastic or polymeric material during gelation and form pores therein, followed by curing the resulting modified applied plastic or polymeric material to produce a stable composite structure made up of a microporous plastic coating adhered to the microporous substrate.

DESCRIPTION OF THE DRAWING

The practice of this invention is schematically illustrated in the accompanying drawing wherein:

FIG. 1 schematically illustrates various steps in accordance with the practices of this invention for the production of a microporous structure wherein the microporous structure is characterized by a microporous plastic coating adhered to a microporous substrate; and wherein FIG. 2 schematically illustrates in cross section a microporous structure in accordance with this invention wherein a microporous plastic coating is applied and adhered to a microporous substrate material, such as resin-impregnated paper.

DESCRIPTION OF THE INVENTION

The invention contemplates applying to a microporous substrate, for absorption thereinto, a preparation adapted to emit very fine gas streams from the pores of the microporous substrate under certain subsequent conditions of time and temperature. A liquid polymeric material, such as a vinyl plastisol, is then coated upon the surface of the microporous substrate, the liquid polymeric material having been chosen to pass through a gelation stage during curing thereof. The assembly is then subjected to heating for a period of time sufficient to release very fine gas streams, e.g. gas jets, from the pore-generating preparation or material absorbed in the substrate during the gelation stage of the overlying polymeric coating layer so that very fine pores are created in the polymeric material layer during gelation. The pores in the polymeric material remain during and after curing of the polymeric material. The subsequent curing stage tends to set the pore boundaries such that the luster, smoothness and general appearance of the cured polymeric layer are not deleteriously affected while at the same time the random distribution of the very fine pores produced in the polymeric material during the gelation stage is retained. The product produced by this procedure retains a major fraction of the permeability of the original microporous substrate as measured by water vapor transmission and air permeability rate and the pores thus produced in the polymeric material layer are of such physical dimensions as not to substantially affect the other physical properties of the composite product.

More particularly, the invention contemplates choosing of a pore-generating liquid to be applied to the microporous substrate so as to have a boiling point or boiling point range situated within the gelation temperature range of the overlying polymeric layer. The actual choice or composition of the pore-generating liquid will depend upon the choice of the overlying polymeric layer. In principle the pore-generating liquid applied to the microporous substrate is formulated so that the effective gas escape rate thereof can be modified by changing the proportions of its constituent liquids. This permits the boiling point or boiling point range of the pore-generating liquid to be adjusted to the proper point within the range of temperature in which gelation occurs in the overlying polymeric material layer. By so choosing the boiling point or boiling point range of the pore-generating liquid and by causing gelation to proceed in the polymeric material layer at a selected temperature range, the rate of emission and the density of emission of gas streams as well as the size (diameter) of emitted gas streams can be controlled relative to the rate of gelation of the polymeric material layer. By thus controlling the rate of gelation of the polymeric layer at the time that the gas jets are being controlled, the kind of density of pores in the finished product may be controlled. Also important is selection of the proper porosity of the substrate so that as the polymeric layer film increases in strength during gelation curing, the gas streams can escape through the underside and sides of the substrate material readily enough to avoid creation of blisters in the polymeric material layer.

Referring now to FIG. 1 of the drawing, a microporous material which may be coated in accordance with the present invention may comprise either naturally occurring materials, such as leather and the like, or may be artificially created materials wherein a mat of fibers, e.g. a mat of cellulose or α-cellulose fibers, is bonded into a paper-like structure, or may be other artificially created structures of a microporous nature. The composition of the solid portions of a microporous substrate according to the present invention is not critical. Rather, the invention contemplates only that there are sufficient interstitial voids or pores, not necessarily visible to the unaided eye, or absorbent fibers in the substrate to render it relatively permeable to gases and moisture. Thus, while the invention is specifically applicable to paper-like microporous substrates, any other form of microporous substrate may be employed if it is desired to apply a polymeric coating to a surface thereof with retention of a major fraction of the gas and moisture permeability of the microporous substrate.

A microporous substrate of the nature just described may be precoated or surface sized prior to subsequent coating operations. This step is not essential in the practice of the invention but with some paper-like microporous materials it is often desirable for other reasons to precoat or size the material prior to the coating steps. With some microporous materials, surface sizing would not be employed, even optionally, because some microporous surfaces do not present a need for surface sizing. Assuming, however, that a surface sizing step is to be practiced, the microporous substrate material may be surface sized with a standard sizing compound such as acrylic, polyvinylchloride, polyvinylidenechloride, acrylonitrile, styrene lattices with or without fillers, e.g. clay, $TiO_2$.

The sized microporous substrate, or where sizing is not employed, the substrate material itself is then surface moistened as by application with trailing blade knife coater or a moistened roller, with the pore-generating liquid. The choice of the pore-generating liquid will have previously been determined by the nature of the polymeric material which is to be cured as an overlying layer on a microporous substrate. While the pore-generating liquid may comprise a single constituent having a boiling point within the gelation temperature range of the polymeric coating which is to be applied thereover, it may also be comprised of a plurality of constituents so that the gas escape temperature range may be varied in accordance with the nature of the polymeric material and the desired characteristics of pore production. The only additional requirements are that the liquid components making up the pore-generating liquid be miscible, and that they do not produce a significant deleterious effect upon the substrate structure itself or the polymeric coating.

The amount of the coating liquid which is applied will depend upon the precise nature of the substrate, i.e. the thickness thereof, the porosity and permeability thereof and absorptivity as well as the nature of the overlying polymeric material layer, i.e. the thickness thereof and the gelling characteristics thereof. Consequently the amount of coating liquid which is applied to the surface of the substrate for sorption thereinto is a matter of choice but in general it is not necessary to thoroughly wet or saturate the substrate; typically a mild degree of moistening thereof is sufficient.

Immediately after the application of the pore-generating liquid to the microporous substrate, the substrate is coated with the overlying polymeric material layer although a short delay is acceptable. The mode of application of the polymeric layer will of course depend upon the specific nature of the substrate material as well as the specific nature of the polymeric material. In general, however, the substrate will be susceptible to use with paper processing and standard coating equipment and the great majority of polymeric coating materials will also be susceptible to use with such equipment. Thus for example a reverse roll assembly may be employed to apply the polymeric material in fluid form as an even coating upon the substrate material. This step is accompanied by the application of sufficient heat to both cause gelation of the polymeric layer as well as to cause very fine gas streams to emanate from the substrate.

The temperature to which the composite structure is subjected will be determined by the boiling point of the pore-generating liquid and the gelation temperature range of the polymeric material layer. Preferably, the temperature should be slightly above the boiling point temperature of the pore-generating liquid and yet within the lower portion of the gelation temperature range of the polymeric material so that the production of the aforesaid very fine gas jets from the substrate occurs prior to and/or during the gelation of the polymeric material layer. Application of heat during this heating step may be practiced by many standard forms of equipment known to the flexible substrate coating art, for example, a preheater or a steam oven may be employed. The heating is carried out until the polymeric material layer passes through its gelation stage and is completely cured.

The final product is a coated substrate wherein the coated surface exhibits high gloss and an apparent unperforated surface while the material actually includes in addition to the pores in the substrate itself, a multiplicity of pores in the polymeric material layer sufficient so that the water vapor permeability of the composite material is a major fraction of the permeability of the substrate material, whereas without the benefit of the present invention the moisture-proofing qualities of the polymeric material layer would render the composite material virtually incapable of any water vapor permeability.

Referring now to FIG. 2 of the drawing there is schematically illustrated therein in partial cross section a porous, permeable substrate 10, such as a paper substrate, provided with a multitude of microporous pores or channels 11 extending across the width of the substrate. There is applied to the porous substrate 10 a plastic layer 12, such as a microporous polyvinyl chloride coating or layer, provided with a multitude of microscopic pores or channels 14 extending across the thickness of plastic layer 12. As is apparent from inspection of FIG. 2 the microporous substrate 11 is permeable and the plastic coating 12 is permeable and the resulting composite structure made up of substrate 10 and plastic coating 12 is also permeable.

It is a feature of the invention that the polymeric coated microporous substrate according to the invention may be embossed or otherwise surface molded with retention of the aforesaid characteristics of gloss as well as water vapor permeability. If desired, the aforementioned embossed microporous coated material may be decorated by printing a pigmented opaque surface with a contrasting color or colors to provide attractive designs, the print can then be topped with a transparent gloss or dull coating either an inflammable organic solvent system or by aqueous media and still maintain a high degree of porosity.

The product according to the invention combines the best attributes of the usual polymeric coated microporous substrate with the best characteristics of the uncoated microporous substrate. This is a new attainment and for the first time a high gloss abrasion resistive and easily cleanable surface can be had with substantially the degree of permeability or microporosity heretofore attainable only with the dull and textured finish of the usual uncoated microporous substrate materials. Furthermore, this new attainment in no way comprises the structural integrity of the composite nor the appearance thereof to the unaided eye.

Various microporous substrate materials may be employed with the present invention. These materials may be either flexible or they may be rigid. In all cases, however, their microporous nature requires that their body be permeated with extremely fine pores. While such microporous substrates are typically flexible mats of fibers bound together, the invention is also applicable to microporous substrates wherein the pores are defined by non-fibrous materials which may even be of a rigid nature.

Illustrative examples of substrates having a microporous nature include the papers wherein natural materials such as lignin act as a natural bonding agent for the wood fibers, papers wherein fibrous material of any nature, whether synthetic or natural, are bound with organic binding agents, other forms of paper-like materials, leathers and other forms of fibrous animal-derived skins and membranes, microporous sintered metal members, ceramic filters and other forms of microporous ceramic bodies and the like.

The pore-generating liquid applied to the microporous substrate prior to coating with the overlying polymeric material layer is chosen to have a boiling point within the range of gelation of the polymeric material so that the generation of gas streams will occur after the polymeric material has reached a stage of set (viscosity) such that it will yield to force of gas jets but not flow back to fill the pore once it is made. Subsequently the film becomes resistant to penetration of the gas, which then escapes out through the substrate. The latter must be low enough in resistance to permit this to occur before the gas creates blisters in the film. It must be high enough in resistance to force the gas through the polymeric material during the early stages of heating.

Choice of the pore-producing liquid will thus clearly depend upon the choice of the applied polymeric coating material. Since many plastic materials pass through a gelation state or become viscous upon heating, they are consequently useful with the present invention. It is apparent that different plastic materials will have different gelation temperature ranges. This is true as between different forms of polymeric material, and is also true within the same form of polymeric material depending upon the molecular weight thereof and other polymeric attributes. For example, the gelation temperature range of a vinyl plastisol is affected by the type and amount of plasticizer or solvating agents. Consequently for best results the pore-generating liquid is chosen to operate with a particular form of polymeric material having a particular gelation range or viscosity curve.

As aforesaid, it is highly advantageous to prepare the pore-generating liquid from two or more constituents which are miscible in one another. When this approach is employed the proportions of the two or more constituents of the pore-generating liquid may be varied to alter the boiling point thereof to make the gas escape within the temperature range required for any one of a variety of polymeric materials. In general, it is desirable that highly volatile and low boiling temperature liquids not be employed as the coating liquid or as a constituent therein if they attach the substrate or polymeric material or are soluble in either. This causes no inconvenience because most polymeric materials which pass through a gelation point (or become suitably viscous upon heating) before hardening have a gelation temperature range in excess of the boiling point of water. For this reason aqueous combinations are highly advantageous when formulating a coating liquid for a specific polymeric material.

Water alone or the combination of polyhydric alcohols or polyols, such as glycerin and water, have been found to be highly advantageous in the practice of the present invention when employed as a pore-generating liquid. The amount of glycerin which is mixed with water to form the coating liquid is determined by the desired boiling temperature of the pore-generating liquid, i.e. how much in excess of the boiling temperature of water is desired. Other materials or compounds which may be used singly or in combination with each other or water, depending upon the boiling point temperature desired, include salts, ketones, aldehydes, esters, organic acids, ethers, alcohols, phenols, etc. or in general any material that is miscible with water to a significant degree and thereby alter its evaporation rate.

The choice of the polymeric material may be viewed as principally an independent choice, i.e. the polymeric material is basically chosen for its own desirability as a coating in the specific application. Consequently any form of plastic coating, preferably one which is applied in fluid form and then cured by heating is adequate, providing that the following additional requisites are met. The material must pass through a gelation or fluent stage before final cure, during which stage the material is sufficiently viscous so as to preserve voids created therein and yet is sufficiently fluent so as to allow the creation of voids therein with relatively low penetration forces, such as those created by rising gas streams.

Desirably, the polymeric material should have a gelation temperature range which is in excess of the boiling temperature of water but not substantially higher than about 400° F. and especially above 500° F. which latter temperature may be regarded as an incipient decomposition temperature for most of those organic, e.g. cellulose substrate materials, useful with the present invention wherein organic molecules form the substrate matrix. With inorganic substrates, high temperatures may be employed, but in general temperatures in the range 212° F. to 500° F. are most useful. The upper temperature limit is of course primarily dictated by practical considerations involving the pore-generating liquid which must have a boiling point within the range of gelation of the polymeric material. The pore-generating material should not be overly volatile to that it might be evaporated after application but before coating with the polymeric material.

The polymeric material and the pore-generating liquid are thus not only coordinated with each other but also with the substrate as well. Examples of polymeric materials which may be used with the present invention include the modified plastisols (limited amounts of diluents) and organosols, phenolics, etc. Particularly useful are the vinyl plastisols.

The following are a number of illustrative examples of the invention. All percentages herein are expressed by weight, unless otherwise stated.

EXAMPLE I

A 22 mil thick paper substrate, manufactured from cellulose fibers bound with 25% of an elastomer known as Buna 2001 (SBR latex manufactured by Hooker Chemical Corporation), was surface moistened with a pore-generating liquid comprising equal parts of glycerin and water. Enough pore-generating liquid was applied so that the mean area moisturization of the substrate was about 4–6%, measured as weight of liquid to weight of substrate. The moistened substrate was then coated by means of a reverse roll assembly with an 8–10 mil wet thick coating of a vinyl plastisol. The vinyl plastisol had a gelation range of 125 to 170° F. Immediately after coating of the vinyl plastisol, the composite was heated in a steam heated forced air oven at 270–280° F. and held at that temperature for 30–60 seconds and then heated to 350–450° F. until final cure of the vinyl plastisol layer was obtained. It was observed that during the gelation stage pores were formed in the vinyl plastisol layer by release of gas from the substrate due to vaporization of the pore-generating liquid absorbed therein.

The water vapor transmission rate in grams per 100 inches square per 24 hours of the resulting coated substrate was measured and found to be 29. Compared to the uncoated substrate performance of 46 which would be lower if total thickness was (22+5=) 27 mils, this represented approximately 60% retention of the water vapor transmission rate. Upon inspection by the unaided eye, the composite coated product showed high gloss and apparent freedom from pores. Examination under a microscope showed a relatively uniform pore density and the pores were seen to have narrow openings which were slightly concave, which latter factors apparently contribute (with their small size) to the invisibility of the pores in the plastic layer to the unaided eye.

EXAMPLE II

A 22 mil thick paper substrate manufactured from alpha cellulose fiber impregnated with 35% of an aqueous emulsion of acrylic polymer sold as Rhoplex B–25 by Rohm & Haas Company was surface moistened with a pore-generating liquid comprising equal parts by weight glycerin and water. Enough pore-generating liquid was applied so that the mean area of the substrate was about 4–6% measured as weight of liquid to weight of substrate. The moistened substrate was then coated by means of a reverse roll assembly with an 8–10 mil wet thick coating of a vinyl plastisol. The vinyl plastisol had a gelation range of 125–175° F. Immediately after coating of the vinyl plastisol the composite was heated in a steam heated forced air oven at a temperature of 270–280° F. and held at that temperature for 30–60° seconds and then heated to 350–450° F. until final cure of the vinyl plastisol layer. It was observed that during the gelation stage pores were formed in the vinyl plastiol layer by release of gas from the substrate due to vaporization of the pore-generating liquid absorbed therein.

The resulting coated substrate was found to be permeable to water vapor and exhibited a permeability amounting to a substantial fraction of the water vapor permeability of the uncoated substrate. Upon inspection by the unaided eye the composite coated product showed high gloss and apparent freedom from pores. Examination under a microscope showed a relatively uniform pore density and the pores were observed to have narrow openings which were slightly concave, which property apparently contributes to the invisibility of the pores in the plastic layer to the unaided eye.

EXAMPLE III

The procedure set forth in Example I hereinabove was repeated save that water was employed as the pore-generating liquid. The results were substantially and almost equal to those obtained in Example I and the retention of the water vapor transmission rate was found to be about 60%.

As will be apparent to those skilled in the art in the light of the foregoing disclosure, many modifications, alterations and substitutions are possible in the practice of this invention without departing from the spirit or scope thereof.

We claim:

1. A method for producing a permeable microporous structure comprising a microporous substrate having a microporous coating of polymeric material thereon which comprises applying an aqueous pore-generating liquid to said substrate for absorption thereinto, said aqueous pore-generating liquid being selected from the group consisting of water and an aqueous solution of a water-miscible material, thereafter applying to said substrate a fluent polymeric material, said polymeric material having been chosen to have a gelation stage temperature range including the temperature at which said pore-generating liquid is vaporized to generate a gas or vapor, heating the resulting coated substrate to and through said gelation stage temperature range and curing the resulting heated polymeric material, the aforesaid heating operation being such that said pore-generating liquid is vaporized to generate a gas or vapor which permeates and passes through said polymeric material so as to impart thereto a microporous structure.

2. A method in accordance with claim 1 wherein said aqueous pore-generating liquid is an aqueous liquid comprising from about 0–50% by weight glycerine and from about 100–50% by weight water.

3. A method in accordance with claim 1 wherein said pore-generating liquid is an aqueous glycerin solution.

4. A method in accordance with claim 1 wherein said fluent polymeric material is a vinyl plastisol.

5. A method in accordance with claim 1 wherein said fluent polymeric material is a vinyl plastisol having a gelation range within the range 120° F. to 500° F.

6. A method in accordance with claim 1 wherein said microporous substrate is a fibrous substrate.

7. A method in accordance with claim 1 wherein said microporous substrate is a cellulosic fibrous substrate.

References Cited
UNITED STATES PATENTS

| | | | |
|---|---|---|---|
| 2,125,901 | 8/1938 | Evans et al. | 117—142 |
| 2,682,484 | 6/1954 | Thomas | 117—155 |
| 2,776,912 | 1/1957 | Gregory | 117—62.2 |
| 2,864,777 | 12/1958 | Greenhoe | 260—2.5 |
| 2,973,285 | 2/1961 | Berke et al. | 117—62.2 |

WILLIAM D. MARTIN, Primary Examiner

T. G. DAVIS, Assistant Examiner

U.S. Cl. X.R.

117—11, 135.5, 155, 161